Figure 1:
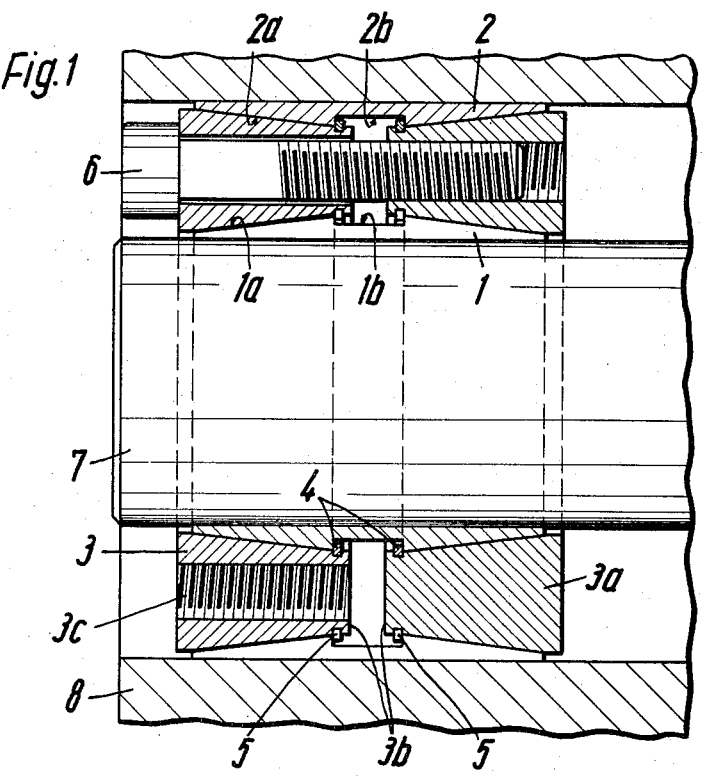

United States Patent [19]
Peter et al.

[11] 3,847,495
[45] Nov. 12, 1974

[54] SYMMETRICAL HUB-TO-SHAFT CONNECTION

[75] Inventors: Oskar E. Peter, Guglingen; Lothar Peter, Brackenheim, both of Germany

[73] Assignee: Oskar E. Peter, Brackenheim, Germany

[22] Filed: Feb. 8, 1973

[21] Appl. No.: 330,744

[30] Foreign Application Priority Data
Mar. 4, 1972  Germany............................ 2210491

[52] U.S. Cl. ............................................... 403/370
[51] Int. Cl. ............................................. F16d 1/06
[58] Field of Search ........... 403/365, 368, 367, 370, 403/371; 29/117

[56] References Cited
UNITED STATES PATENTS
3,590,652  7/1971  Strang............................ 403/371 X
3,720,429  3/1973  Friedrichs et al............... 403/370 X Primary Examiner—Werner H. Schroeder
Attorney, Agent, or Firm—Flynn & Frishauf

[57] ABSTRACT

A pair of double-conically shaped elements can be tightened against each other by means of clamping screws, the conical surfaces sliding over matching conical surfaces formed at opposed faces of inner and outer sleeves, adapted to seat respectively on a shaft, and in a hub. To form one self-retaining assembly, the inner ends of the conical elements are formed with projecting shoulders, for example by placing snaprings thereover, which engage in grooves in the inner and outer sleeves, so that the various parts of the connection will always remain together.

10 Claims, 2 Drawing Figures

PATENTED NOV 12 1974  3,847,495

SYMMETRICAL HUB-TO-SHAFT CONNECTION

CROSS REFERENCE TO RELATED PATENTS AND APPLICATIONS

U.S. Pat. Nos. 3,656,785 3,679,247 3,717,367 and 3,776,651.

The present invention relates to a hub-to-shaft connection which is symmetrical, and in which an axially slit inner and outer sleeve is placed, respectively, over the shaft and within the hub, the sleeves being formed with outer and inner conical surfaces against which conical lockings rings can be tightened.

Various types of hub-to-shaft connections have been proposed — see for example the cross-referenced patents and also German Patent No. 1,099,806. The cone angle of the conical locking rings, using double-conical elements, is selected to be above that of self-friction retaining so that the interconnection between hub and shaft can be loosened after the axial compressive force of the interconnection is released. Such an arrangement requires a comparatively large number of clamping screws, arranged circumferentially around the interconnection, in order to be capable of transmitting large torques between hub and shaft. As the number of clamping screws is increased, the number of bores and tapped holes in the double-conical locking rings likewise is increased, which increases manufacturing costs, as well as costs arising during assembly. When such a hub-to-shaft connection is assembled, the various locking screws must be tightened by means of a torque wrench, and then checked crosswise, so that the design-torque transmission will actually be achieved by the interconnection. Such tightening requires skill in assembly, takes time, and hence is expensive. Additionally, hub-to-shaft interconnections in which separable elements are used are inconvenient to ship since, if anyone of the parts becomes separated from the rest of the assembly, replacement of the particular part may be difficult.

It is an object of the present invention to provide a hub-to-shaft interconnection which is capable of transmitting high torques and which is so constructed that it nevertheless is a unitary assembly in which the various movable elements are coupled together so that they cannot become separated or lost, in which mounting of the interconnection between hub and shaft is simple, and which is additionally so constructed that the interconnection can be severed.

SUBJECT MATTER OF THE PRESENT INVENTION

Briefly, inner and outer axially slit sleeves are provided, adapted to seat on a shaft, or within a hub, respectively. The slit sleeves are formed with oppositely facing outer and inner conical surfaces, in which conical clamping rings are inserted which, when tightened against each other, press the inner and outer sleeves against the shaft, and the hub, respectively. The inner portions of the sleeves, and of the rings, are formed with matching projections and recesses, such as ring grooves and ring-shaped shoulders, which engage in each other. Before assembly of the unit, and for shipping, the split sleeves can be compressed or expanded, so that the shoulders and grooves will snap into each other to provide an assembly from which no parts can be removed, and which can readily be slipped over a shaft and within the bore of a hub. In a preferred form, the sleeves are formed with the grooves, and the conical locking elements are formed with the shoulders, for example by having a cylindrical end portion to which inner and outer snap rings are secured to engage in the matching grooves of the inner and outer sleeves, respectively. The construction permits the use of a lesser number of circumferentially arranged clamping bolts and further the placement of threaded bores in the sleeves to permit pressing off the locking rings from each other and thus separation of the hub-to-shaft connection.

Figure 2:
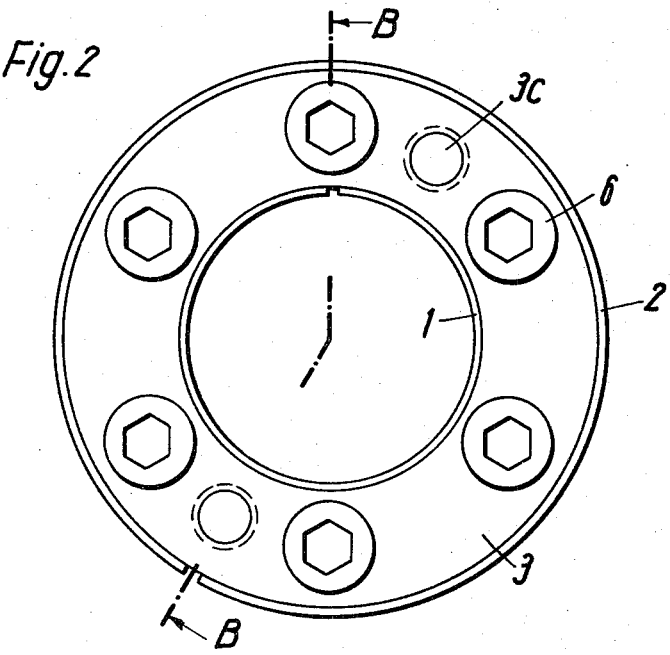

The invention will be described by way of example with reference to the accompanying drawings, wherein:

FIG. 1 is a longitudinal cross-sectional view through the assembly, before tightening, to interconnect a hub to a shaft, taken along section B—B of FIG. 2; and FIG. 2 is a front view of the interconnection of FIG. 1.

The hub-to-shaft connection is inserted between a shaft 7 and the bore of a hub 8. The interconnection has an axially slit inner ring 1 which has interior cylindrical surfaces adapted to bear against shaft 7. An outer, axially slit ring 2 has outer cylindrical surfaces adapted to bear against the inner bore of hub 8. Facing each other, the inner and outer rings 1, 2 are formed with double-conical surfaces 1a, 2a, respectively, having a cone angle which is self-locking, when a matching cone is fitted thereagainst. The sleeves 1, 2, in their middle, are formed with circumferential grooves 1b, 2b, respectively. A pair of locking rings 3, 3a, with outer conical surfaces matching the conical surfaces 1a, 2a, are inserted, against each other, into the sleeves 1, 2. To tighten the locking rings 3, 3a against each other, the locking ring 3 is formed with bores matching tapped holes in the ring 3a, through which bolts 6, preferably Allen head bolts, can be inserted to tighten the conical surfaces against each other and spread outer ring 2 while circumferentially compressing inner ring 1. Additionally, locking ring 3 is formed with two diametrically located tapped holes 3c. There are no matching holes in the ring 3a. To provide a complete assembly from which no parts can be lost, the double-conical rings 3, 3a are formed with a cylindrical projection 3b at their inner end. The cylindrical projection is formed with inner and outer grooves, into which inner and outer snap rings 4, 5 are inserted. The snap rings are axially slit and resilient. The snap rings, when snapped into the grooves, fit into the grooves 1b, 2b of the inner and outer sleeves, respectfully so that the locking rings 3, 3a cannot be removed from the assembly while, however, permitting axial movement of the locking rings towards each other when tightened by the bolts 6.

Use and operation: Upon tightening bolts 6, the double-conical locking rings 3, 3a are moved in counter-direction towards each other, sliding over conical surfaces 1a, 2a of the sleeves 1, 2. This provides radial pressure of the inner sleeve 1 on shaft 7 and of the outer sleeve 2 in the bore of hub 8, resulting in reliable and secure interconnection over the entire circumference of the shaft and the hub, without play, and without axial shifting of the assembly.

To remove the interconnection, bolts 6 are loosened and two bolts 6 are removed from their respective holes, to be threaded into the tapped holes 3c, the ends of the bolts then bearing against the inner faces of the locking ring 3a. Upon further tightening of the bolts in holes 3c, the locking rings are forced away from each other, to release the tension on the conical surfaces. No other removal tool is necessary. If the angle of the conical surfaces is selected such that it is not self-locking then the tapped holes 3c are not needed.

The hub-to-shaft connection thus permits coupling of a hub and shaft, reliably and accurately together, while transmitting substantial torque, and permits release of the assembly without requiring additional tools. By selecting the the conical angle to be self-locking, the torque transmission is enhanced and only a few tightening bolts 6, for example six bolts as shown in FIG. 2, are needed. A typical bolt 6 will be made of material, such as structural steel having a strength of about 100 kp/mm². If bolts of higher strength are used, such as bolts having a strength of 140 kp/mm², then the forces which can be transmitted are substantially enhanced since the double-conical surfaces can be tightened against each other with greater force. Locking rings having conical angles which are self-locking permit reduction in radial dimension of the entire set, which improves the force transmission as well as centricity of the hub and the shaft. The interconnection uses elements which are both axially and radially movable, and yet the locking rings with the double conical surfaces, and the associated bearing sleeves provide one unitary assembly from which parts cannot be removed or lost, thus decreasing assembly, mounting and disassembly time and costs. The slit inner and outer sleeves, with their facing conical surfaces are preferably made of strip or band-like material, the oppositely facing conical surfaces and the central groove being first milled in a suitable milling machine, with milling cutters simultaneously cutting both conical surfaces and the grooves; the band or strip is then rolled into cylindrical form. The locking rings, likewise, are easily manufactured. Even very wide hub-to-shaft connections, of substantial axial length, thus can be made easily and inexpensively.

The springy snap rings 4,5 are not strictly necessary, but are a simple way of connecting the locking rings so that they cannot be removed or lost after the assembly is assembled together. It is also possible to form the locking rings with an inner, projecting collar adjacent their inner conical ends, which collar fits into the ring grooves 1b, 2b of the inner and outer sleeves.

Various changes and modifications may be made within the inventive concept.

We claim:

1. In a hub-to-shaft connection, to interconnect a shaft (7) to a hub (8) having
    an axially slit inner sleeve (1) having a cylindrical surface adapted to bear with its inner surface against the shaft (7),
    an axially slit outer sleeve (2) having an outer cylindrical surface adapted to bear with its outer surface against the surface of the bore of a hub (8);
    the inner sleeve (1) having a central inner region and outer double-conical surfaces (1a) extending from said central region and the outer sleeve having a central inner region and inner double-conical surfaces (2a) extending from said region;
    a pair of axially separated double-conical locking rings (3,3a) having inner and outer conical surfaces fitting against one outer conical surface (1a) of the inner ring (1) and the inner conical surface (2a) of the outer ring (2), respectively, and interposed between the conical surfaces of said inner and outer rings (1,2),
    and clamp means (6) engaging said locking rings to move the locking rings towards each other and thus effect sliding movement of the conical surfaces against each other and press the cylindrical surfaces against the shaft and hub, respectively, to concentrically lock the hub and the shaft together,
    the inner regions of the conical surfaces of the inner and outer sleeves (1, 2) and the inner facing ends of the locking rings being formed with circumferentially located, radially extending interengaging shoulders (4, 5) and recess means (1b, 2b).

2. Connection according to claim 1, wherein the interengaging shoulder and recess means comprise
    substantially cylindrical grooves (1b, 2b) formed in the inner and outer surfaces of the respective central region of the outer and inner sleeves (1, 2), respectively,
    inwardly directed radially extending projection means (4) formed on the inner end of the locking rings engaging in the outer groove (1b) of the inner sleeve (1) and outwardly directed radially extending projection means (5) formed on the outer end of the locking rings engaging into the inner groove (2b) of the outer sleeve (2).

3. Connection according to claim 2, wherein the inner projection means (4) comprises a circumferential ring.

4. Connection according to claim 2, wherein the outer projection means (5) comprises a circumferential ring.

5. Connection according to claim 2, wherein the inner projection means (4) comprises an axially split circumferentially extending spring ring.

6. Connection according to claim 2, wherein the outer projection means (5) comprises an axially split circumferentially extending spring ring.

7. Connection according to claim 2, wherein the inner projection means (4) comprises an essentially circumferentially extending shoulder formed at the inner end of the respective conical locking ring.

8. Connection according to claim 2, wherein the outer projection means (5) comprises an essentially circumferentially extending shoulder formed at the inner end of the respective conical locking ring.

9. Connection according to claim 1, wherein the clamp means comprises one of the locking rings (3) being formed with smooth bores, the other of the locking rings (3a) being formed with tapped bores, and bolts (6) passing through the smooth bores into the tapped bores, said one ring (3) being further formed with tapped bores (3c) extending towards the inner face of the other ring (3a) to permit threading of bolts into the further tapped bores (3c) and separate the locking rings by axial pressure.

10. Connection according to claim 1, wherein said double-conical locking rings (3, 3a) have inner cylindrical projections formed with grooves therein;
    and the interengaging shoulder and recess means comprise grooves (1b, 2b) circumferentially extending and formed in the respective central region of the inner and outer sleeves (1, 2), respectively, of sufficient width to span the distance between the axial extensions of the locking rings when loosely inserted in the assembly;
    and snap rings (4, 5) engaged in the grooves in the extensions and bearing against the shoulders formed in the sleeves by the grooves (1b, 2b) therein.

* * * * *